United States Patent
Sikljovan et al.

(10) Patent No.: US 10,078,841 B2
(45) Date of Patent: Sep. 18, 2018

(54) USER POSITIVE APPROVAL AND AUTHENTICATION SERVICES (UPAAS)

(71) Applicant: STANTON MANAGEMENT GROUP, INC., Binghamton, NY (US)

(72) Inventors: Branislav Sikljovan, Guelph (CA); Radosav Andric, Etobicoke (CA)

(73) Assignee: Stanton Management Group, Inc., Binghamton, NY (US)

( * ) Notice: Subject to any disclaimer, the term of this patent is extended or adjusted under 35 U.S.C. 154(b) by 0 days.

(21) Appl. No.: 15/443,185

(22) Filed: Feb. 27, 2017

(65) Prior Publication Data
US 2017/0169427 A1    Jun. 15, 2017

Related U.S. Application Data

(63) Continuation of application No. 12/848,973, filed on Aug. 2, 2010, now Pat. No. 9,619,801.

(51) Int. Cl.
*G06Q 20/40*    (2012.01)

(52) U.S. Cl.
CPC ......... *G06Q 20/409* (2013.01); *G06Q 20/401* (2013.01)

(58) Field of Classification Search
CPC .... G06Q 20/40; G06Q 20/322; G06Q 20/325; G06Q 20/3674; G06Q 20/3821; G06Q 20/4012; G06Q 20/3829; H04L 63/083; H04L 2209/56; H04W 12/06
See application file for complete search history.

(56) References Cited

U.S. PATENT DOCUMENTS

| | | | | |
|---|---|---|---|---|
| 6,895,391 B1* | 5/2005 | Kausik | ................... | G06F 21/34 |
| | | | | 705/50 |
| 7,110,792 B2* | 9/2006 | Rosenberg | ........... | G06Q 20/085 |
| | | | | 235/380 |
| 7,331,518 B2* | 2/2008 | Rable | ................... | G06Q 20/10 |
| | | | | 235/380 |
| 8,140,418 B1* | 3/2012 | Casey | ................... | G06Q 20/10 |
| | | | | 370/401 |
| 8,566,239 B2* | 10/2013 | Arthur | ................ | G06Q 20/105 |
| | | | | 705/41 |
| 8,577,804 B1* | 11/2013 | Bacastow | ........... | G06Q 20/027 |
| | | | | 235/380 |

(Continued)

*Primary Examiner* — Mohammad Z Shaikh
(74) *Attorney, Agent, or Firm* — Maier & Maier, PLLC

(57) ABSTRACT

The invention provides Users of Retail Payment and Identification instruments with the ability to review transaction details and approve transaction by capturing UVM in User controlled environment and Issuers of these instruments with the ability to positively authenticate Users in Issuer controlled environment. The invention accounts for real time legacy or non-legacy processing systems to provide an authorization request from POA to Issuer Host. The invention introduces two UPAAS components—User Gateway and User Application. The UPAAS User Gateway is implemented in an Issuer controlled environment enabling interface between Issuer legacy Host and UPAAS User Applications. The UPAAS User Application can be implemented on any device supporting communication protocol such as TCP/IP without any hardware changes enabling the User to login to UPAAS User Gateway, review and approve or decline a specific transaction in real time by entering UVM, such as PIN, for User authentication purposes.

5 Claims, 6 Drawing Sheets

(56) References Cited

U.S. PATENT DOCUMENTS

| | | | |
|---|---|---|---|
| 9,619,801 B2* | 4/2017 | Sikljovan | G06Q 20/40 |
| 2004/0243856 A1* | 12/2004 | Shatford | G06F 21/32 |
| | | | 726/5 |
| 2005/0240522 A1* | 10/2005 | Kranzley | G06Q 20/02 |
| | | | 705/40 |
| 2006/0080243 A1* | 4/2006 | Kemper | G06Q 20/102 |
| | | | 705/40 |
| 2006/0131390 A1* | 6/2006 | Kim | G06Q 20/24 |
| | | | 235/380 |
| 2006/0165060 A1* | 7/2006 | Dua | G06Q 20/20 |
| | | | 370/352 |
| 2007/0052517 A1* | 3/2007 | Bishop | G06Q 20/10 |
| | | | 340/5.2 |
| 2007/0125842 A1* | 6/2007 | Antoo | G06Q 20/0658 |
| | | | 235/380 |
| 2007/0198411 A1* | 8/2007 | Kavanagh | G06Q 20/04 |
| | | | 705/44 |
| 2007/0262136 A1 | 11/2007 | Ou | |
| 2008/0272188 A1* | 11/2008 | Keithley | G06Q 20/12 |
| | | | 235/379 |
| 2008/0288405 A1 | 11/2008 | John | |
| 2009/0083160 A1* | 3/2009 | Hagale | G06Q 20/10 |
| | | | 705/17 |
| 2009/0287936 A1 | 11/2009 | Ohkado | |
| 2010/0250442 A1* | 9/2010 | Coppinger | G06Q 20/20 |
| | | | 705/75 |
| 2010/0291895 A1 | 11/2010 | Drzyzga et al. | |
| 2010/0312703 A1 | 12/2010 | Kulpati et al. | |
| 2010/0317318 A1 | 12/2010 | Carter et al. | |
| 2010/0318446 A1 | 12/2010 | Carter | |
| 2011/0006113 A1 | 1/2011 | Uchikura | |
| 2011/0251910 A1 | 10/2011 | Dimmick | |
| 2012/0030114 A1* | 2/2012 | Sikljovan | G06Q 20/40 |
| | | | 705/44 |
| 2013/0041831 A1* | 2/2013 | Das | G06Q 20/20 |
| | | | 705/72 |
| 2013/0191290 A1* | 7/2013 | Glendenning | G06Q 20/20 |
| | | | 705/71 |

* cited by examiner

USER POSITIVE APPROVAL AND AUTHENTICATION SERVICES (UPAAS)

CROSS REFERENCE TO RELATED APPLICATIONS

This application is a continuation of U.S. patent application Ser. No. 12/848,973, now U.S. Pat. No. 9,619,801, filed Aug. 2, 2010, the contents of which are herein incorporated by reference.

BACKGROUND OF THE INVENTION

The foundation of the invention was a realization of the existing problems and opportunities that emerging technologies are bringing along in the areas of transaction approval and User authentication for Retail Payment and Identification transactions.

Recognized Problems
  For a number of years the Card industry has been facing demands for a stronger Cardholder authentication and better protection of User and Payment instrument proprietary information. The Card industry responded with EMV-chip cards where an offline PIN was introduced replacing or substituting signature as CVM. An Offline PIN is significantly more reliable than a signature however it came with a price: the cost of EMV implementation and maintenance is significant and is billed to all parties: Merchants/POA, Acquirer, Network and Issuers. Another downside is that the PIN remained captured at POA and User verification remained within the POA environment. To mitigate the risks the Payment Card Industry (PCI) introduced PED and Data Security standards which improved security however also further increased the cost of implementation and maintenance. Verification of a CVM at the POA means that the Issuer is advised of the Cardholder Verification Result, but not actually performing User authentication, which opens up doors for "wedge" (man-in-the middle) attacks and other fraud risks.
  The personal and traveler's cheques industry currently provides the ability to validate the cheques or drafts being presented, verify the history of the User (account holder), to validate the Routing Number and verify the User Account number status, However User authentication is not currently available for cheque transactions which along with the cost of Cheque Verification processing contributed to the constant decline of cheque use.
  Users of identification instruments like Insurance and Health cards are either not authenticated at all or the authentication is performed by the acceptor using other pictured IDs, like a Driver's license.
Perceived Opportunities
  Mass adoption of data enabled devices enables a reach to Users of Retail payment and Identification instruments in real time, anytime, anywhere enabling User transaction approval and User authentication in Issuer controlled environment that was previously not possible.
  Providing Users of Payment and Identification instruments with the ability to review and approve transactions and enter UVMs at the devices they control improves the security of UVM and effectively externalizes User Transaction approval and User authentication from POA/acceptor's environment thus removing the line between User (Cardholder) Present and User (Cardholder) Not Present transactions.
  User Transaction approval and User authentication naturally belong to Issuer environment. Ensuring this decouples the Payment Instrument information (processed in authorization request/response) from User Authentication information which significantly contributes to fraud prevention.

BRIEF SUMMARY OF THE INVENTION

The invention accounts for legacy or non-legacy real time processing systems providing transaction details captured at a POA to the Issuer Host through an Acquirer and when appropriate Network environment in the form of transaction authorization request. At a minimum the Transaction authorization request provides Payment or Identification Instrument ID (i.e. Primary Account Number), POA information (i.e. Acceptor Name and Location) and Transaction Amount.
  The invention introduces two components:
    UPAAS User Gateway (125) implemented in Issuer controlled environment which facilitates processing of Approval Request/Response between Issuer Card, Card-less or ID Legacy systems and UPAAS User Application (122).
    UPAAS User Application (122) which can be implemented on any device supporting appropriate data communication protocol such as TCP/IP. It provides Users with ability to review and accept or decline the transaction once the authorization request is received by the Issuer. The User confirms acceptance of a transaction by entering UVM which is encrypted by the UPAAS User application and forwarded to Issuer for User authentication and Issuer approval.
  The invention externalizes User Authentication from a legacy POA, Acquiring and Network systems and enables Issuers of Retail Payment and Identification instruments with ability to positively authenticate Users of these instruments in real time in Issuer controlled environment without any involvement of POA, acquiring and network systems in User authentication.
  The invention externalizes User transaction approval from a legacy POA and enables Issuers of Retail Payment and Identification instruments with ability to request a transaction approval from Users in real time after the Issuer receives authorization request for the transaction and before the Issuer approval is granted. As a result of this the invention makes the Issuer approval contingent to the User's approval ensuring non-repudiation of Issuer approved transactions.
  The invention provides Users of Retail Payment and Identification instruments with the ability to review and approve or decline transaction and capture UVM on self controlled devices, thus decoupling Point of (Instrument) Acceptance from Point of Transaction Approval and Point of User Authentication, which effectively removes the line between User Present and User Not-Present transactions.
  By externalizing User Authentication from the POA the invention ensures that the Payment Instrument information (i.e. Primary Account Number) and User Verification information (i.e. PIN) are neither captured nor processed together at any point of the transaction life cycle. This prevents the association of the Instrument and UVM information by anyone but the User and Issuer, thus reducing the possibility of creating and using the counterfeit instruments.
  The major benefits of the invention are the following:
    No physical changes or modifications are required to devices where the UPAAS User Application is implemented.

Issuer performs User Authentication in its own environment which is currently possible for ATM on-us transactions only. The same increases transaction security and simplifies implementation and change management: any modification or improvements can be done without impacts to Merchant, Acquirer and Network environments.

Acceptors of Payment or Identification instruments are spared from implementing and maintaining User Authentication functions at their POA devices while enjoying increased guarantee of payment and non-repudiation.

Acquirer processors and Networks are spared from implementing and maintaining Industry mandates related to User authentication and data security standards including but not limited to secure UVM capture, encryption and support of associated key infrastructure.

Users are provided with the opportunity to review and approve or decline the transaction in a self controlled environment and the ability to identify and decline a fraudulent or incorrectly processed transaction request before it is processed by the Issuer Host.

BRIEF DESCRIPTION OF THE SEVERAL VIEWS OF THE DRAWINGS

The drawings provided herein present possible implementation scenarios of the invention. These scenarios should be taken as examples only and they are not meant to limit implementation of the invention beyond presented scenarios, nor limit the scope, implementation type or configuration of the invention providing that the spirit of the invention is preserved as set forth in the invention claims.

DETAILED DESCRIPTION OF THE INVENTION

Details of end-to end transaction flow and User transaction approval and User Authentication processes are as presented in FIGS. 1-6 and corresponding descriptions in the tables below.

TABLE 1

Figure 1:
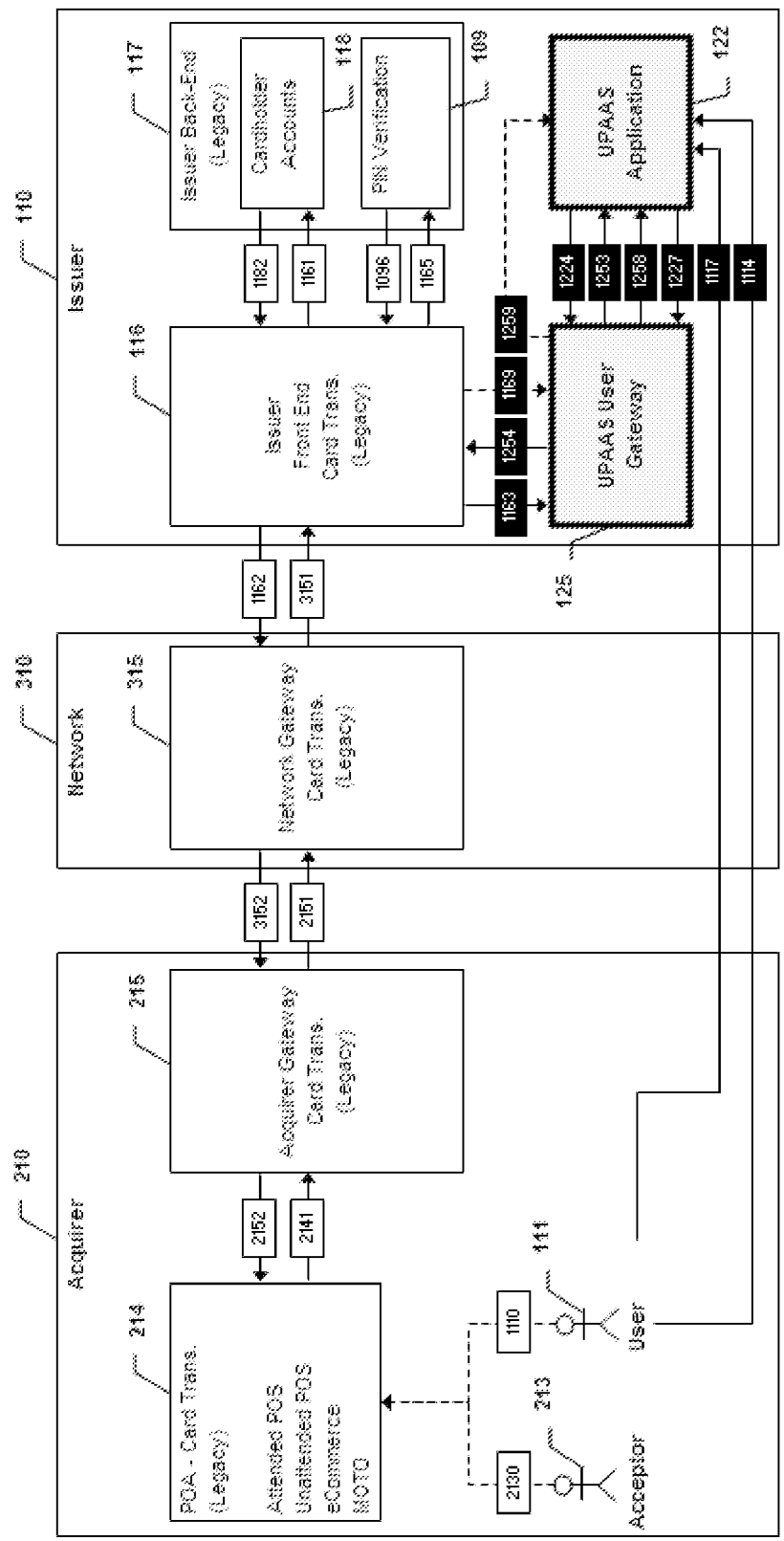
FIG. 1 presents a process flow of the embodiment enabling transaction approvals to Users and User Authentication to Issuers of non-proprietary Card Retail Payment Instruments in legacy Open Loop scenario where Issuer uses its legacy system for PIN verification.

Detailed description of process flow and relevant business logic exercised in UPAAS implementation scenario presented in FIG. 1 where User Approval and Authentication processes are exercised for Card retail payment transactions initiated and processed in an Open Loop Card Legacy environment where Issuer verifies PIN in its legacy environment.

| | |
|---|---|
| 1110 | If unattended POA 111 swipes card; If eCommerce transaction 111 enters Card number and other requested information (i.e. CVV2/CVC2) as requested by e-Commerce web site. |
| 2130 | If attended POA 213 swipes card and enters amount; If MOTO 213 enters Card number and amount; |
| 1117 | 111 activates 122 in order to establish connection with 125 |
| 1227 | 122 sends Login Request to 125 where User Name is implicitly provided by 122. Subject to Issuer requirements Password is either entered by 111 or implicitly provided by 122 |
| 1258 | 125 verifies User Name & Password, checks 111 status and if valid sends Login Response to 122/establishes an open session and awaits for Approval Request from 116 |
| 2141 | 214 sends Authorization Request to 215 with appropriate 214 information, Transaction Amount and captured Card Information |
| 2151 | 215 enriches Authorization Request with appropriate acquirer and merchant information and Forwards Authorization Request to 315 |
| 3151 | 315 identifies 116 based on PAN BIN and forwards Authorization Request to 116 |
| 1163 | 116 checks PAN provided in 3151 to determine if 111 is registered for UPAAS services and if yes sends Approval Request to 125 with PAN, 214 information and Transaction Amount |
| 1253 | 125 identifies 122 using PAN, checks 122 status and if valid sends Approval Request to 122 |
| 1114 | 111 reviews 214 Name & Location, Transaction Amount as received in 1253 and displayed by 122 and confirms acceptance by entering PIN and "From Account Type" |
| 1224 | 122 sends Approval Response to 125 with encrypted PIN Block and "From Account" type |
| 1254 | 125 sends Approval Response to 116 with encrypted PIN Block and "From Account" type |

TABLE 1-continued

Detailed description of process flow and relevant business logic exercised in UPAAS implementation scenario presented in FIG. 1 where User Approval and Authentication processes are exercised for Card retail payment transactions initiated and processed in an Open Loop Card Legacy environment where Issuer verifies PIN in its legacy environment.

| | |
|---|---|
| 1165 | 116 sends PIN Verification Request to 109 |
| 1096 | 109 verifies PIN and sends PIN Verification Response to 116 |
| 1161 | 116 sends Fund Authorization Request to 118 |
| 1182 | 118 verifies account balance/open to buy and sends Authorization Response to 116 |
| 1162 | 116 sends Authorization Response to 315 |
| 3152 | 315 forwards Authorization Response to 215 |
| 2152 | 215 forwards Authorization Response to 214 at which point goods or services are granted to 111 |
| 1169 | Subject to Issuer Requirement 116 sends Authorization Advice to 125 |
| 1259 | If 1169 received from 116 then 125 sends Authorization Advice to 122 at which point the session is closed |

TABLE 2

Figure 2:
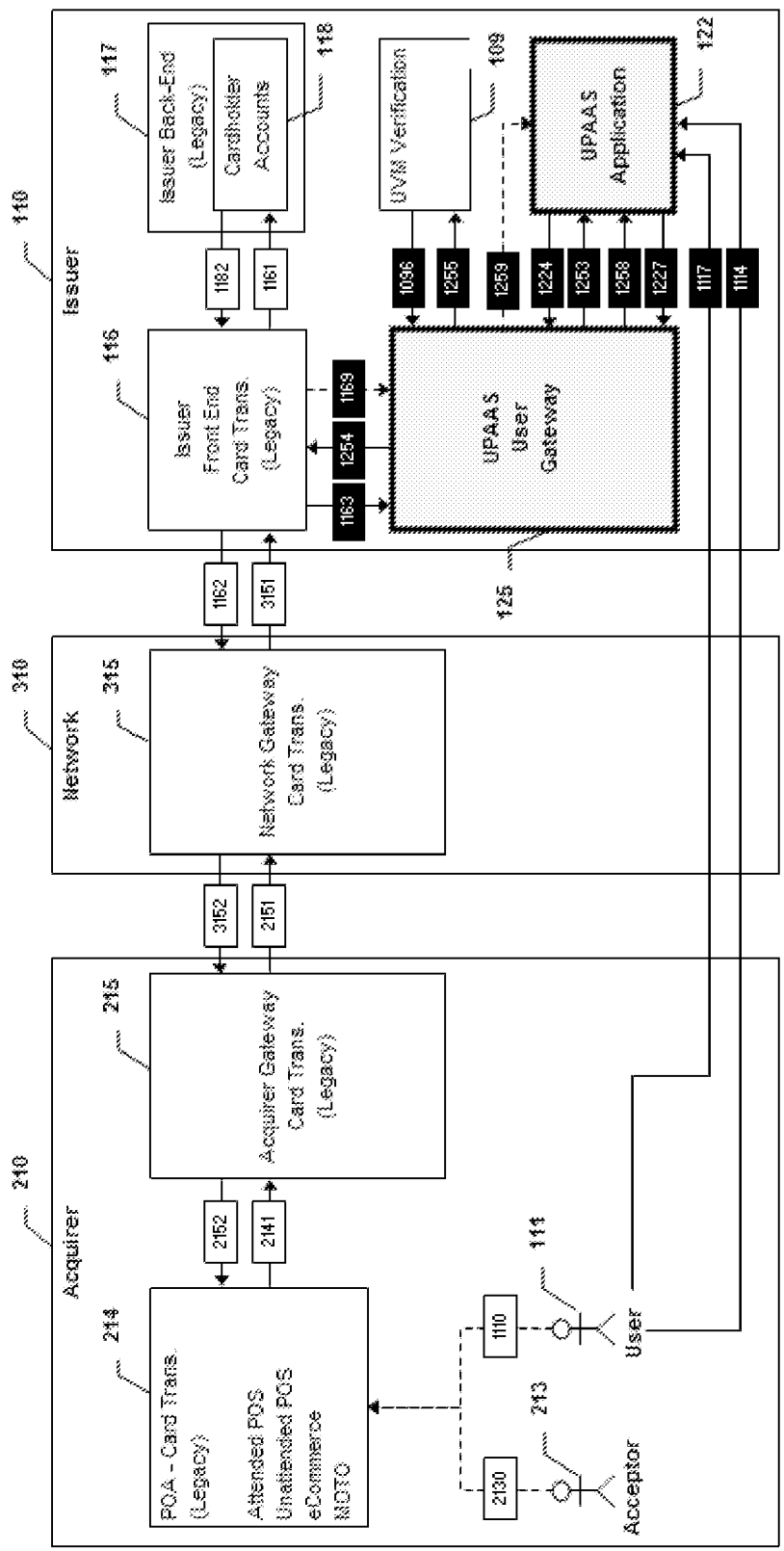
FIG. 2 presents a process flow of the embodiment enabling transaction approvals to Users and User Authentication to Issuers of non-proprietary Card Retail Payment Instruments in legacy Open Loop scenario where Issuer uses UPAAS for UVM verification.

Detailed description of process flow and relevant business logic exercised in UPAAS implementation scenario presented in FIG. 2 where User Approval and Authentication processes are exercised for Card retail payment transactions initiated at and processed through an Open Loop Card Legacy environment where UVM Verification is completed between the UPAAS User Gateway and Issuer UVM Verification system.

| | |
|---|---|
| 1110 | If unattended POA 111 swipes card; if eCommerce transaction 111 enters Card number and other requested information (i.e. CVV2/CVC2) as requested by e-Commerce web site. |
| 2130 | If attended POA 213 swipes card and enters amount; If MOTO 213 enters Card number and amount; |
| 1117 | 111 activates 122 in order to establish connection with 125 |
| 1227 | 122 sends Login Request to 125 where User Name is implicitly provided by 122. Subject to Issuer requirements Password is either entered by 111 or implicitly provided by 122 |
| 1258 | 125 verifies User Name & Password, checks 111 status and if valid sends Login Response to 122/establishes an open session and awaits for Approval Request from 116 |
| 2141 | 214 sends Authorization Request to 215 with appropriate 214 information, Transaction Amount and captured Card Information |
| 2151 | 215 enriches Authorization Request with appropriate acquirer and merchant information and Forwards Authorization Request to 315 |
| 3151 | 315 identifies 116 based on PAN BIN and forwards Authorization Request to 116 |
| 1163 | 116 checks PAN provided in 3151 to determine if 111 is registered for UPAAS services and if yes sends Approval Request to 125 with PAN, 214 information and Transaction Amount |
| 1253 | 125 identifies 122 using PAN, checks 122 status and if valid sends Approval Request to 122 |
| 1114 | 111 reviews 214 Name & Location, Transaction Amount as displayed by 122 and confirms acceptance by entering UVM and "From Account Type" |
| 1224 | 122 sends Approval Response to 125 with Encrypted UVM and "From Account" type |
| 1255 | 125 sends UVM Verification Request to 109 |
| 1096 | 109 verifies UVM and sends UVM Verification Response to 125 |
| 1254 | 125 sends Approval Response to 116 with "From Account" type |
| 1161 | 116 sends Fund Authorization Request to 118 |
| 1182 | 118 verifies account balance/open to buy and sends Authorization Response to 116 |
| 1162 | 116 sends Authorization Response to 315 |
| 3152 | 315 forwards Authorization Response to 215 |
| 2152 | 215 forwards Authorization Response to 214 at which point goods or services are granted to 111 |
| 1169 | Subject to Issuer Requirement 116 sends Authorization Advice to 125 |
| 1259 | If 1169 received from 116 125 sends Authorization Advice to 122 at which point the session is closed |

TABLE 3

Figure 3:
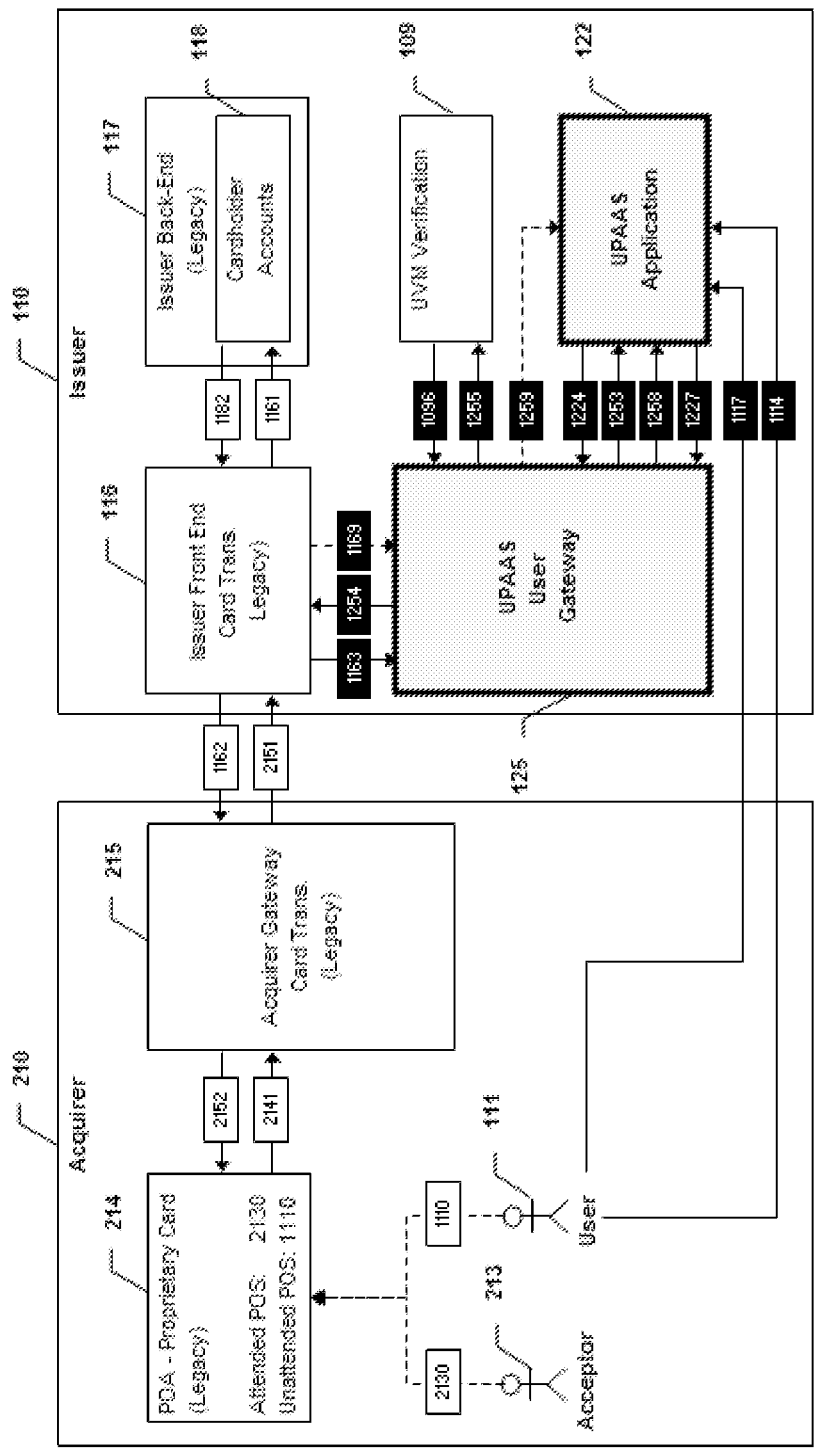
FIG. 3 presents a process flow of the embodiment enabling transaction approval to Users and User Authentication to Issuers of proprietary Card Retail Payment Instruments in legacy Closed Loop scenario where Issuer uses UPAAS for UVM verification.

Detailed description of process flow and relevant business logic exercised in UPAAS implementation scenario presented in FIG. 3 where User Approval and Authentication processes are exercised for Card retail payment transactions initiated at and processed through a Closed Loop Card Legacy environment where UVM Verification is completed between the UPAAS User Gateway and Issuer UVM Verification system.

| | |
|---|---|
| 1110 | If unattended POA 111 swipes card. |
| 2130 | If attended POA 213 swipes card and enters amount |
| 1117 | 111 activates 122 in order to establish connection with 125 |
| 1227 | 122 sends Login Request to 125 where User Name is implicitly provided by 122. Subject to Issuer requirements Password is either entered by 111 or implicitly provided by 122 |
| 1258 | 125 verifies User Name & Password, checks 111 status and if valid sends Login Response to 122/establishes an open session and awaits for Approval Request from 116 |
| 2141 | 214 sends Authorization Request to 215 with appropriate 214 information, Transaction Amount and captured Card information |
| 2151 | 215 enriches Authorization Request with appropriate acquirer and merchant information and Forwards Authorization Request to 116 |
| 1163 | 116 checks PAN provided in 3151 to determine if 111 is registered for UPAAS services and if yes sends Approval Request to 125 with PAN, 214 information and Transaction Amount |
| 1253 | 125 identifies 122 using PAN, checks 122 status and if valid sends Approval Request to 122 |
| 1114 | 111 reviews 214 Name & Location, Transaction Amount as displayed by 122 and confirms acceptance by entering UVM and "From Account Type" |
| 1224 | 122 sends Approval Response to 125 with UVM Block Encrypted and "From Account" type |
| 1255 | 125 sends UVM Verification Request to 109 |
| 1096 | 109 verifies UVM and sends UVM Verification Response to 125 |
| 1254 | 125 sends Approval Response to 116 with "From Account" type |
| 1161 | 116 sends Fund Authorization Request to 118 |
| 1182 | 118 verifies account balance/open to buy and sends Authorization Response to 116 |
| 1162 | 116 sends Authorization Response to 215 |
| 2152 | 215 forwards Authorization Response to 214 at which point goods or services are granted to 111 |
| 1169 | Subject to Issuer Requirement 116 sends Authorization Advice to 125 |
| 1259 | If 1169 received from 116 then 125 sends Authorization Advice to 122 at which point the session is closed |

TABLE 4

Figure 4:
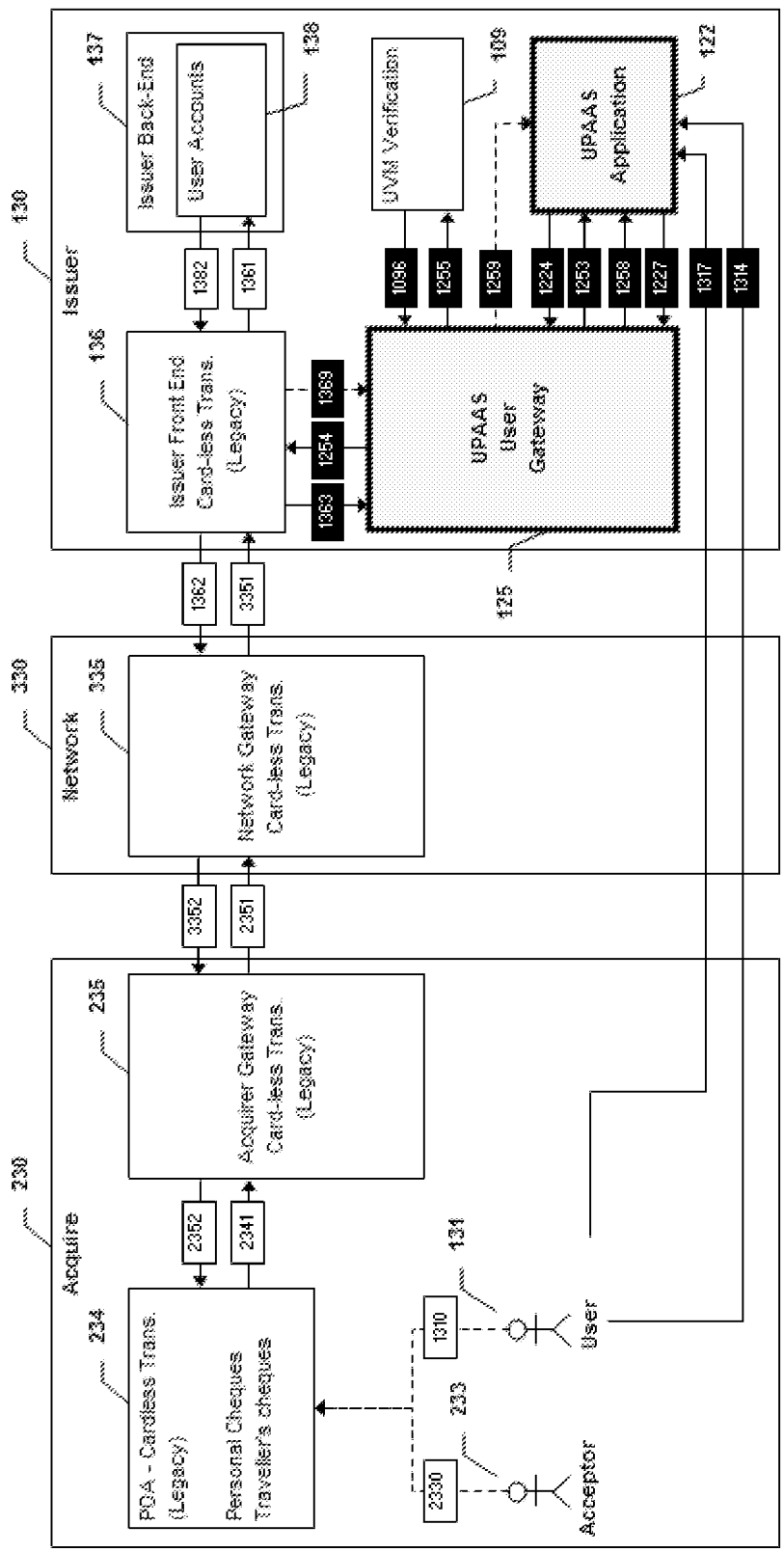
FIG. 4 presents a process flow of the embodiment enabling transaction approval to Users and User Authentication to Issuers of Card-less Retail Payment Instruments in legacy Open Loop scenario where Issuer uses UPAAS for UVM verification.

Detailed description of process flow and relevant business logic exercised in UPAAS implementation scenario presented in FIG. 4 where User Approval and Authentication processes are exercised for Card-less retail payment transactions initiated at and processed through an Open Loop Legacy environment where UVM Verification is completed between the UPAAS User Gateway and Issuer UVM Verification system.

| | |
|---|---|
| 2330 | 233 enters amount and Cheque number (manual entry or bar code read) |
| 1317 | 131 activates 122 in order to establish connection with 125 |
| 1227 | 122 sends Login Request to 125 where User Name is implicitly provided by 122. Subject to Issuer requirements Password is either entered by 131 or implicitly provided by 122 |
| 1258 | 125 verifies User Name & Password, checks 131 status and if valid sends Login Response to 122/establishes an open session and awaits for Approval Request from 136 |
| 2341 | 234 sends Cheque Verification Request to 235 with appropriate 234 information, Transaction Amount and captured Cheque Information |
| 2351 | 235 sends Cheque Verification Request with appropriate acquirer and merchant information to 335 |
| 3351 | 335 identifies 136 based on cheque number and forwards Cheque Verification Request to 136 |
| 1363 | 136 checks Cheque Number provided in 3351 to verify if 131 is registered for UPAAS services and if yes sends Approval Request to 125 with Cheque Number, 234 information and Transaction Amount |
| 1253 | 125 identifies 122 using Cheque Number, checks 122 status and if valid sends Approval Request to 122 |
| 1314 | 131 reviews Cheque Number, 234 Name & Location, Transaction Amount as displayed by 122 and confirms acceptance by entering UVM |
| 1224 | 122 sends Approval Response to 125 with encrypted UVM Block |
| 1255 | 125 sends UVM Verification Request to 109 |
| 1096 | 109 verifies UVM and sends UVM Verification Response to 125 |
| 1254 | 125 sends Approval Response to 136 |
| 1361 | 136 sends Fund Authorization Request to 138 |
| 1382 | 138 verifies account balance against requested amount and sends Fund Authorization Response to 136 |
| 1362 | 136 sends Cheque Verification Response to 335 |

TABLE 4-continued

Detailed description of process flow and relevant business logic exercised in UPAAS implementation scenario presented in FIG. 4 where User Approval and Authentication processes are exercised for Card-less retail payment transactions initiated at and processed through an Open Loop Legacy environment where UVM Verification is completed between the UPAAS User Gateway and Issuer UVM Verification system.

3352   335 forwards Cheque Verification Response to 235
2352   235 forwards Cheque Verification Response to 234 at which point goods or services or cash withdrawal is granted to 131
1369   Subject to Issuer Requirement 136 sends Cheque Verification Advice to 125
1259   If 1369 received from 136 then 125 sends Cheque Verification Advice to 122 at which point the session is closed

TABLE 5

Figure 5:
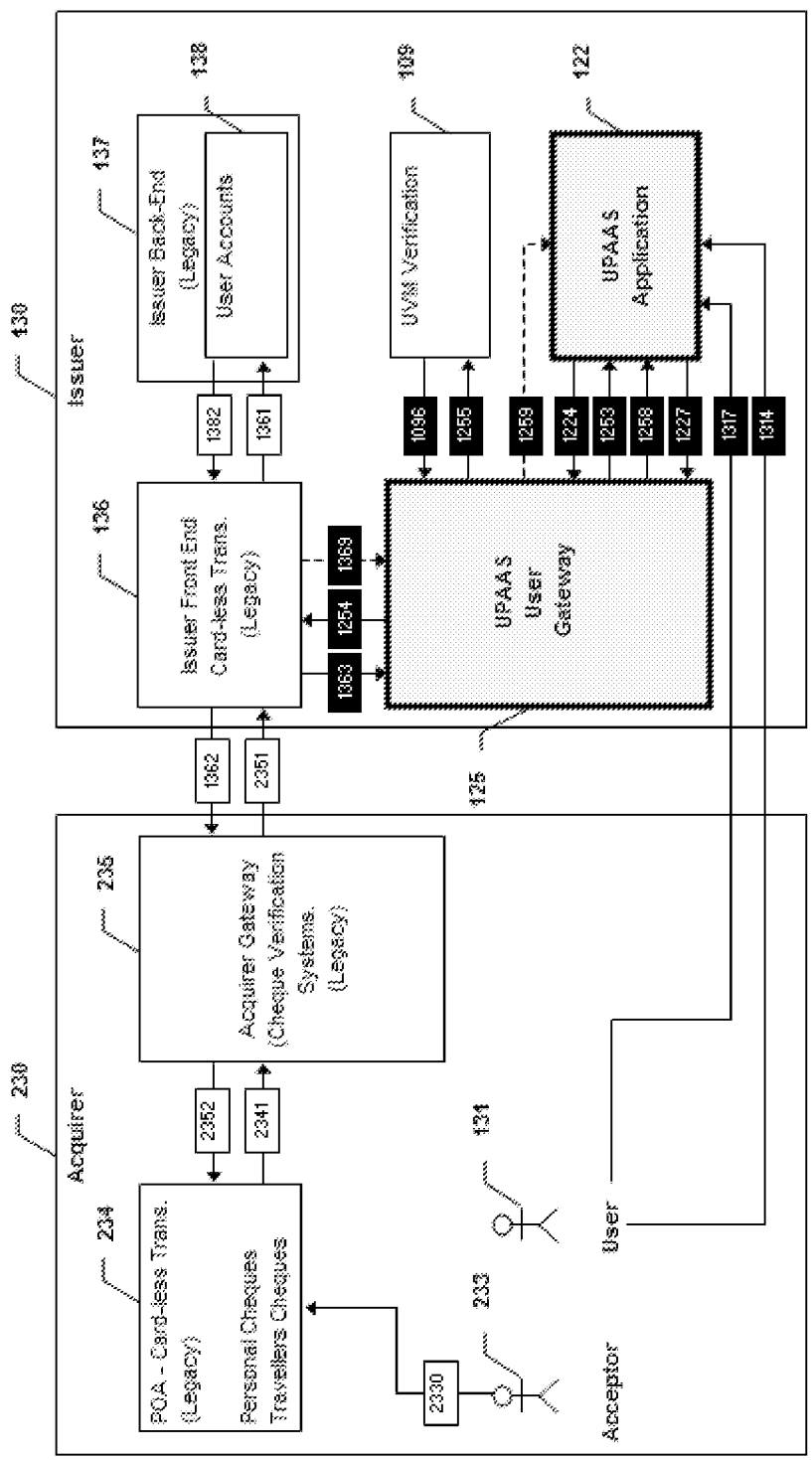
FIG. 5 presents a process flow of the embodiment enabling transaction approval to Users and User Authentication to Issuers of Card-less Retail Payment Instruments in legacy Closed Loop scenario where Issuer uses UPAAS for UVM verification.

Detailed description of process flow and relevant business logic exercised in UPAAS implementation scenario presented in FIG. 5 where User Approval and Authentication processes are exercised for Card-less retail payment transactions initiated at and processed through a Close Loop Legacy environment where UVM Verification is completed between the UPAAS User Gateway and Issuer UVM Verification system.

2330   233 enters amount and cheque number (manual entry or bar code read)
1317   131 activates 122 in order to establish connection with 125
1227   122 sends Login Request to 125 where User Name is implicitly provided by 122. Subject to Issuer requirements Password is either entered by 131 or implicitly provided by 122
1258   125 verifies User Name & Password, checks 131 status and if valid sends Login Response to 122/establishes an open session and awaits for Approval Request from 136
2341   234 sends Cheque Verification Request to 235 with appropriate 234 information, Transaction Amount and captured Cheque Information
2351   235 sends Cheque Verification Request with appropriate acquirer and merchant information to 136
1363   136 checks Cheque Number provided in 3351 to verify if 131 is registered for UPAAS services and if yes sends Approval Request to 125 with Cheque Number, 234 information and Transaction Amount
1253   125 identifies 122 using Cheque Number, checks 122 status and if valid sends Approval Request to 122
1314   131 reviews Cheque Number, 234 Name & Location, Transaction Amount as displayed by 122 and confirms acceptance by entering UVM
1224   122 sends Approval Response to 125 with encrypted UVM Block
1255   125 sends UVM Verification Request to 109
1096   109 verifies UVM and sends UVM Verification Response to 125
1254   125 sends Approval Response to 136
1361   136 sends Fund Authorization Request to 138
1382   138 verifies account balance against requested amount and sends Fund Authorization Response to 136
1362   136 sends Cheque Verification Response to 235
2352   235 forwards Cheque Verification Response to 234 at which point goods or services or cash withdrawal is granted to 131
1369   Subject to Issuer Requirement 136 sends Cheque Verification Advice to 125
1259   If 1369 received from 136 then 125 sends Cheque Verification Advice to 122 at which point the session is closed

TABLE 6

Figure 6:
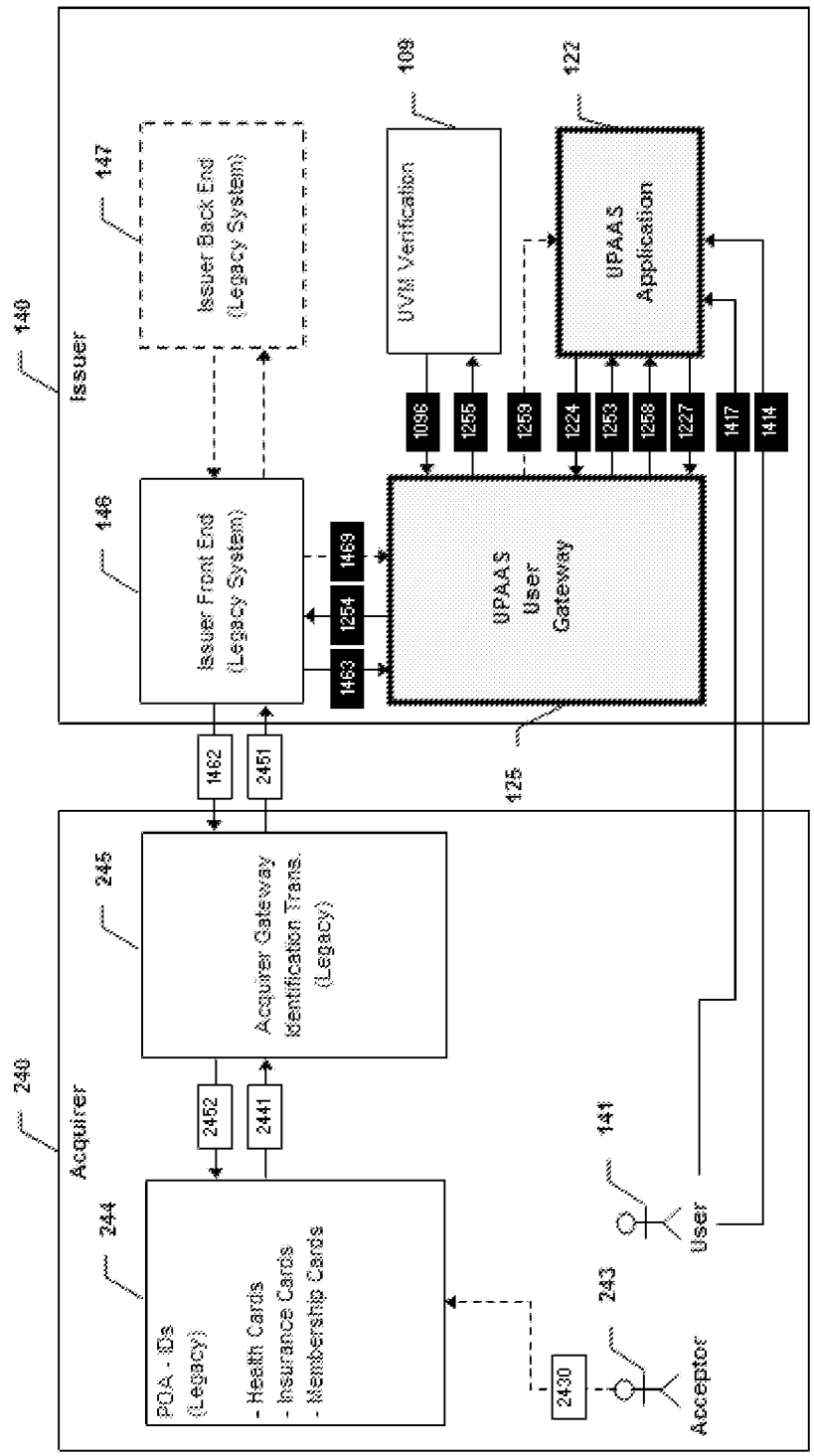
FIG. 6 presents a process flow of the embodiment enabling transaction approval to Users and User Authentication to Issuers when Identification Instruments are used in legacy Closed Loop scenario where Issuer uses UPAAS for UVM verification.

Detailed description of process flow and relevant business logic exercised in UPAAS implementation scenario presented in FIG. 6 where User Approval and Authentication processes are exercised for Identification instrument transactions initiated at and processed through a Close Loop processing environment where UVM Verification is completed between the UPAAS User Gateway and Issuer UVM Verification system 2430   243 enters ID Number (manually or through bar or magstripe read)
1417   141 activates 122 in order to establish connection with 125
1227   122 sends Login Request to 125 where User Name is implicitly provided by 122. Subject to Issuer requirements Password is either entered by 141 or implicitly provided by 122
1258   125 verifies User Name & Password, checks 141 status and if valid sends Login Response to 122/establishes an open session and awaits for Approval Request from 146
2441   244 sends ID Verification Request to 245 with appropriate 244 information and captured ID Information
2451   245 forwards ID Verification Request to 146
1463   146 checks ID provided in 2451 to determine if 141 is registered for UPAAS services and if yes sends Approval Request to 125 with 214 information TABLE 6-continued Detailed description of process flow and relevant business logic exercised in UPAAS implementation scenario presented in FIG. 6 where User Approval and Authentication processes are exercised for Identification instrument transactions initiated at and processed through a Close Loop processing environment where UVM Verification is completed between the UPAAS User Gateway and Issuer UVM Verification system

| | |
|---|---|
| 1253 | 125 identifies 122 using ID, checks its status and if valid sends Approval Request to 122 |
| 1414 | 141 reviews 244 Name & Location as displayed by 122 and confirms acceptance by entering UVM |
| 1224 | 122 sends Approval Response to 125 with encrypted UVM Block |
| 1255 | 125 sends UVM Verification Request to 109 |
| 1096 | 109 verifies UVM and sends UVM Verification Response to 125 |
| 1254 | 125 sends Approval Response to 146 |
| 1462 | 146 sends ID Verification Response to 245 |
| 2452 | 245 forwards ID Verification Response to 244 at which point User verification has been confirmed |
| 1469 | Subject to Issuer Requirement 146 sends ID Verification Advice to 125 |
| 1259 | If 1469 received from 146 then 125 sends ID Verification Advice to 122 at which point the session is closed |

What is claimed is:

1. A method for issuers of retail payment and identification instruments to request and receive approval from users of these instruments in real time to authenticate the users, comprising:

sending a request, from an issuer host, to a user comprising a request for the user to provide information of a data connected device during a registration process wherein this information is associated with a user ID and used for processing a user approval request and response;

sending download instructions for a user application to the user for the user to download the user application to the data connected device over a wired or wireless communication protocol;

providing the user with an ability to activate the user application using a one-time authentication key or a method selected by the issuer;

receiving, at the issuer host, a transaction authorization request from at least one of a network or an acquirer, the transaction authorization request comprising information describing a presently-unapproved transaction;

sending the user approval request in real time requesting the user to approve or decline the transaction and prompting the user to enter a user verification method key, wherein the issuer host is further programmed to create and send the user approval request to the user once the transaction authorization request is received from the at least one of the network or the acquirer and before the transaction authorization request is processed for approval by the issuer host;

capturing the user verification method key for approved transactions, wherein subject to the issuer host discretion the user verification method contains information known only to the user; and sending the user approval response to the issuer host for approval by the issuer.

2. The method of claim 1, wherein the user approval request includes at least the user ID, an acceptor name and location, and a transaction currency and amount.

3. The method of claim 1, wherein the user approval request requests additional information from the user including at least one account type.

4. The method of claim 1, wherein the user approval response indicates whether the user accepted or declined the transaction, wherein user acceptance of the transaction includes an encrypted user verification method key block.

5. The method of claim 1, further comprising:

encrypting the user verification method key using either symmetric or asymmetric keys;

sending the encrypted user verification method key in the user approval response without including any other information that can be associated with the identity of the user identity or the user payment and identification instrument information;

decrypting the user verification method key block received in the user approval response using either symmetric or asymmetric keys; and verifying an authenticity of the user.

* * * * *